US012669202B2

(12) United States Patent
Pfeil et al.

(10) Patent No.: US 12,669,202 B2
(45) Date of Patent: Jun. 30, 2026

(54) CONNECTION DEVICE FOR CONNECTING TUBULAR COMPONENTS

(71) Applicant: EISELE GmbH, Waiblingen (DE)

(72) Inventors: Patrick Pfeil, Kernen im Remstal (DE); Sebastian Gehring, Weinstadt (DE)

(73) Assignee: EISELE GmbH, Waiblingen (DE)

( * ) Notice: Subject to any disclaimer, the term of this patent is extended or adjusted under 35 U.S.C. 154(b) by 0 days.

(21) Appl. No.: 18/698,438

(22) PCT Filed: Mar. 25, 2022

(86) PCT No.: PCT/EP2022/057884
§ 371 (c)(1),
(2) Date: Apr. 4, 2024

(87) PCT Pub. No.: WO2023/057095
PCT Pub. Date: Apr. 13, 2023

(65) Prior Publication Data
US 2025/0237338 A1 Jul. 24, 2025

(30) Foreign Application Priority Data

Oct. 5, 2021 (AT) .............................. A 50796/2021

(51) Int. Cl.
F16L 37/091 (2006.01)

(52) U.S. Cl.
CPC ................................ F16L 37/0915 (2016.05)

(58) Field of Classification Search
CPC ... F16L 37/0915; F16L 37/098; F16L 37/092; F16L 37/133; F16L 37/0927; F16L 37/091; F16L 37/0925

(Continued)

(56) References Cited

U.S. PATENT DOCUMENTS 2,857,176 A 10/1958 Mctaggart et al.
3,569,903 A * 3/1971 Brishka .............. H01R 13/6277
403/321

(Continued)

FOREIGN PATENT DOCUMENTS

DE 530 177 C 7/1931
DE 34 05 229 A1 9/1985

(Continued)

OTHER PUBLICATIONS

International Search Report in PCT/EP2022/057884, mailed Jun. 30, 2022.

Primary Examiner — David Bochna
(74) Attorney, Agent, or Firm — Collard & Roe, P.C.

(57) ABSTRACT

A connection device includes a base body with a hose-receiving region, wherein a seal-receiving region is formed in the hose-receiving region and wherein a collet-chuck-receiving region is formed in the hose-receiving region, a collet chuck with a connection opening for receiving a line-shaped component, the connection opening having a connection opening diameter, the collet chuck having elastically resilient clamping elements distributed over the circumference, the collet chuck being received in the collet-chuck-receiving region so as to be displaceable in the axial direction relative to the base body, the clamping elements being displaceable in the radial direction by axial displacement of the collet chuck relative to the base body, a sealing element, which is arranged in the seal-receiving region and forms a seal between the line-shaped component and the base body. The connection device is configured to receive line-shaped components with different line diameters.

12 Claims, 3 Drawing Sheets

(58) Field of Classification Search
USPC .......................... 285/314, 315, 316, 323, 324
See application file for complete search history.

(56) References Cited

U.S. PATENT DOCUMENTS

| | | | | |
|---|---|---|---|---|
| 5,005,877 | A * | 4/1991 | Hayman | ............. F16L 37/0842 |
| | | | | 285/317 |
| 5,205,568 | A | 4/1993 | Stoll et al. | |
| 5,437,483 | A * | 8/1995 | Umezawa | ............. F16L 37/091 |
| | | | | 285/308 |
| 5,722,696 | A | 3/1998 | Taneya | |
| 6,983,959 | B2 * | 1/2006 | Wolf | ................... F16L 37/0842 |
| | | | | 285/314 |
| 7,029,035 | B2 * | 4/2006 | Seymour, II | ........ F16L 37/0982 |
| | | | | 285/308 |
| 7,380,836 | B2 | 6/2008 | Bogdanowicz et al. | |
| 7,455,328 | B2 * | 11/2008 | Chelchowski | ........ F16L 19/086 |
| | | | | 285/354 |

| | | | | |
|---|---|---|---|---|
| 7,832,774 | B2 * | 11/2010 | Densel | ................ F16L 37/0842 |
| | | | | 285/308 |
| 7,918,002 | B2 * | 4/2011 | Kissel | ................. F16L 37/0927 |
| | | | | 29/237 |
| 9,841,131 | B2 | 12/2017 | Hagen et al. | |
| 10,480,698 | B2 * | 11/2019 | Rafteseth | ............ F16L 37/0926 |
| 2008/0018106 | A1 * | 1/2008 | Paluncic | ............. F16L 37/0927 |
| | | | | 285/307 |
| 2010/0187811 | A1 * | 7/2010 | Topping | .............. F16L 37/0927 |
| | | | | 285/148.4 |
| 2018/0266603 | A1 * | 9/2018 | Gnutti | ................. F16L 37/0925 |

FOREIGN PATENT DOCUMENTS

| | | | | |
|---|---|---|---|---|
| DE | 41 08 221 A1 | 9/1992 | | |
| DE | 695 21 291 T2 | 5/2002 | | |
| DE | 10 2004 046 548 B3 | 6/2005 | | |
| DE | 10 2012 108 791 A1 | 3/2014 | | |
| EP | 0 379 655 A2 | 8/1990 | | |
| EP | 0 738 851 A1 | 10/1996 | | |
| GB | 2060106 A * | 4/1981 | ......... F16L 37/0915 |

* cited by examiner

CONNECTION DEVICE FOR CONNECTING TUBULAR COMPONENTS

CROSS REFERENCE TO RELATED APPLICATIONS

This application is the National Stage of PCT/EP2022/057884 filed on Mar. 25, 2022, which claims priority under 35 U.S.C. § 119 of Austrian Application No. A 50796/2021 filed on Oct. 5, 2021, the disclosure of which is incorporated by reference. The international application under PCT article 21 (2) was not published in English.

BACKGROUND OF THE INVENTION

1. Field of the Invention

The invention relates to a connection device for connecting line-shaped components suitable for guiding a flow medium, such as pressure medium hoses, pressure medium lines or the like, to one another or to other components.

2. Description of the Related Art

Such connection devices are used particularly in pneumatics to connect pressure medium hoses, pressure medium lines or the like, which guide pressure media, to one another or to other pneumatic components, such as working cylinders, valves, pressure gauges or the like.

A generic connection device is known from EP0379655A2, for example.

The connection device known from EP0379655A2 has the disadvantage of an inadequate hold for pressure medium hoses.

SUMMARY OF THE INVENTION

The problem to be solved of the present invention was to overcome the disadvantages of the prior art and to provide an improved connection device.

This problem is solved by a connection device in accordance with the claims.

According to the invention, a connection device is configured to connect line-shaped components suitable for guiding a flow medium to one another or to other components. The connection device comprises:

a base body with a hose-receiving region, wherein a seal-receiving region is formed in the hose-receiving region and wherein a collet-chuck-receiving region is formed in the hose-receiving region a collet chuck with a connection opening for receiving a line-shaped component, the connection opening having a connection opening diameter, the collet chuck having a plurality of elastically resilient clamping elements distributed over the circumference, the collet chuck being received in the collet-chuck-receiving region so as to be displaceable in the axial direction relative to the base body, the clamping elements being displaceable in the radial direction by axial displacement of the collet chuck relative to the base body a sealing element, which is arranged in the seal-receiving region and forms a seal between the line-shaped component and the base body.

The connection device is configured to receive line-shaped components with different line diameters.

The connection device according to the invention has the advantage that only a single type of connection device is required for line-shaped components with different line diameters. As a result, the number of different connection devices required can be reduced, thus improving the production of connection devices overall, since only a smaller number of different tools is required to produce the connection devices. This in turn can result in quality improvements of the connection devices. Furthermore, the connection device according to the invention can improve the receivability of line-shaped components with different line diameters, which can compensate for manufacturing-related diameter inaccuracies.

Furthermore, it can be expedient for a first axial stop to be formed in the base body, having a first cylindrical lateral surface with a first axial stop diameter, and for a second axial stop to be formed, having has a second cylindrical lateral surface with a second axial stop diameter. This offers the advantage that a first type of the line-shaped component with a first line diameter can be attached to the first axial stop and is thus defined in its insertion position, and that a second type of line-shaped components with a second line diameter can be attached to the second axial stop and can thus assume a different axial position in the inserted state. In this way, the dead space in the area of the axial stop outside the line-shaped component can be kept as small as possible. Furthermore, as a result of this measure, line-shaped components with a smaller line diameter can be inserted further into the connection device than line-shaped components with a larger line diameter. Thus, the required pull-out resistance can also be achieved for line-shaped components with small line diameters.

Furthermore, it can be provided that the first axial stop has a first end face and the second axial stop has a second end face, wherein the first end face and the second end face are arranged spaced apart from one another in the axial direction at an end face distance. This measure makes it possible to achieve a different insertion depth for different line-shaped components with different line diameters.

Furthermore, it can be provided that the second axial stop diameter is between 87% and 99.9%, in particular between 92% and 98%, preferably between 93.5% and 94.5% of the connection opening diameter. This offers the advantage that any type of line-shaped components that have a different line diameter can achieve a secure fit in the connection device. In particular, it can be provided that the connection opening diameter is 6.35 mm and has a tolerance of +/−0.1 mm. Furthermore, it can be provided that the first axial stop diameter is configured to be the same size as the connection opening diameter. In this way, the first axial stop diameter can also be 6.35 mm with a tolerance of 0.1 mm. Furthermore, it can be provided that the second axial stop diameter is 6 mm with a tolerance of +/−0.1 mm.

Another embodiment is also advantageous, according to which it can be provided that the first axial stop has a first axial stop longitudinal extension and that the second axial stop has a second axial stop longitudinal extension, wherein the first axial stop longitudinal extension is between 90% and 110%, in particular between 95% and 105%, preferably between 98% and 102% of the second axial stop longitudinal extension. This offers the advantage that both a first line-shaped component with a first line diameter and a second line-shaped component with a second line diameter can be accommodated with a secure fit in the connection device.

According to an advancement, it is possible for the sealing element to have a sealing element diameter, wherein the sealing element diameter is between 25% and 55%, in particular between 30% and 45%, preferably between 37% and 43% of the connection opening diameter. Such a diameter ratio in particular offers the surprising advantage that different line-shaped components with different line diameters can be held securely and effectively in the connection device.

Furthermore, this measure makes it possible to achieve a surprisingly good seal when using different line-shaped components with different line diameters. In particular, it can be provided that the sealing element has a sealing element diameter between 2.3 mm and 2.7 mm, in particular 2.5 mm.

Furthermore, it can be expedient for the sealing element to have a hardness between 30 Shore A and 75 Shore A, in particular between 40 Shore A and 60 Shore A, preferably between 47 Shore A and 53 Shore A. This measure makes it possible to achieve a surprisingly good seal when using different line-shaped components with different line diameters.

Furthermore, it can be provided that the first end face is arranged at a first angle to a central axis and that the second end face is arranged at a second angle to the central axis, wherein the first angle and/or the second angle is between 30° and 89°, in particular between 30° and 70°, preferably between 40° and 60°. This offers the advantage that a secure fit of different line-shaped components with different line diameters in the connection device can be achieved.

Furthermore, it can be provided that the sealing element has a sealing element diameter and that the seal-receiving region has a seal-receiving height, wherein the seal-receiving height is between 50% and 90%, in particular between 65% and 85%, preferably between 75% and 80% of the sealing element diameter. This offers the surprising advantage that different line-shaped components with different line diameters can be held with sufficient sealing in the connection device.

It can be provided that a clamping bevel has a clamping bevel opening angle between 10° and 45°, in particular between 12° and 30°, preferably between 14° and 20°. If the clamping bevel has a clamping bevel opening angle within the specified range, it can be achieved that different line-shaped components with different line diameters can be accommodated in the connection device, wherein a sufficient clamping effect can be achieved by the fixing lugs with the different line diameters. With a clamping bevel configured as such, the fixing lugs can simultaneously be pressed far enough apart from one another so as to release different line-shaped components with different line diameters for removal from the connection device.

Furthermore, it can be provided that a collet chuck opener is formed which corresponds to the clamping elements, wherein the collet chuck opener is displaceable relative to the collet chuck, and wherein the collet chuck opener has an actuating region, which is configured to bear against an opening bevel of the clamping elements. This offers the advantage that easier release of the line-shaped components can be achieved by using the collet chuck opener. In particular, the collet chuck can be opened by displacing the collet chuck opener in the direction of the collet chuck, wherein the actuating region bears against the opening bevel of the clamping elements and presses them apart. Particularly by means of the collet chuck opener, different line-shaped components with different line diameters can be accommodated in the connection device or removed from the connection device again in a simplified manner.

Furthermore, it can be provided that the guide region has an offset drawn towards the central axis at a longitudinal end facing away from the collet chuck opener. The offset can be used to achieve retention in the collet chuck opener. In particular, it can be provided that the offset comes into positive contact with the base body of the connection device when the collet chuck opener is displaced in the axial direction relative to the base body.

Furthermore, it can be provided that the collet chuck opener has a first end wall, which connects the guide region to the actuating region. This results in a simplified structure of the collet chuck opener. In particular, it can be provided that the guide region and the actuating region are configured together in a u shape with the first end wall when viewed in longitudinal section.

The Shore A hardness is determined according to the measurement method standardized in DIN ISO 7619-1.

BRIEF DESCRIPTION OF THE DRAWINGS

The figures below elaborate on the invention to offer better understanding thereof.

The figures show in greatly simplified, schematic depiction.

DETAILED DESCRIPTION OF THE PREFERRED EMBODIMENTS

Figure 1:
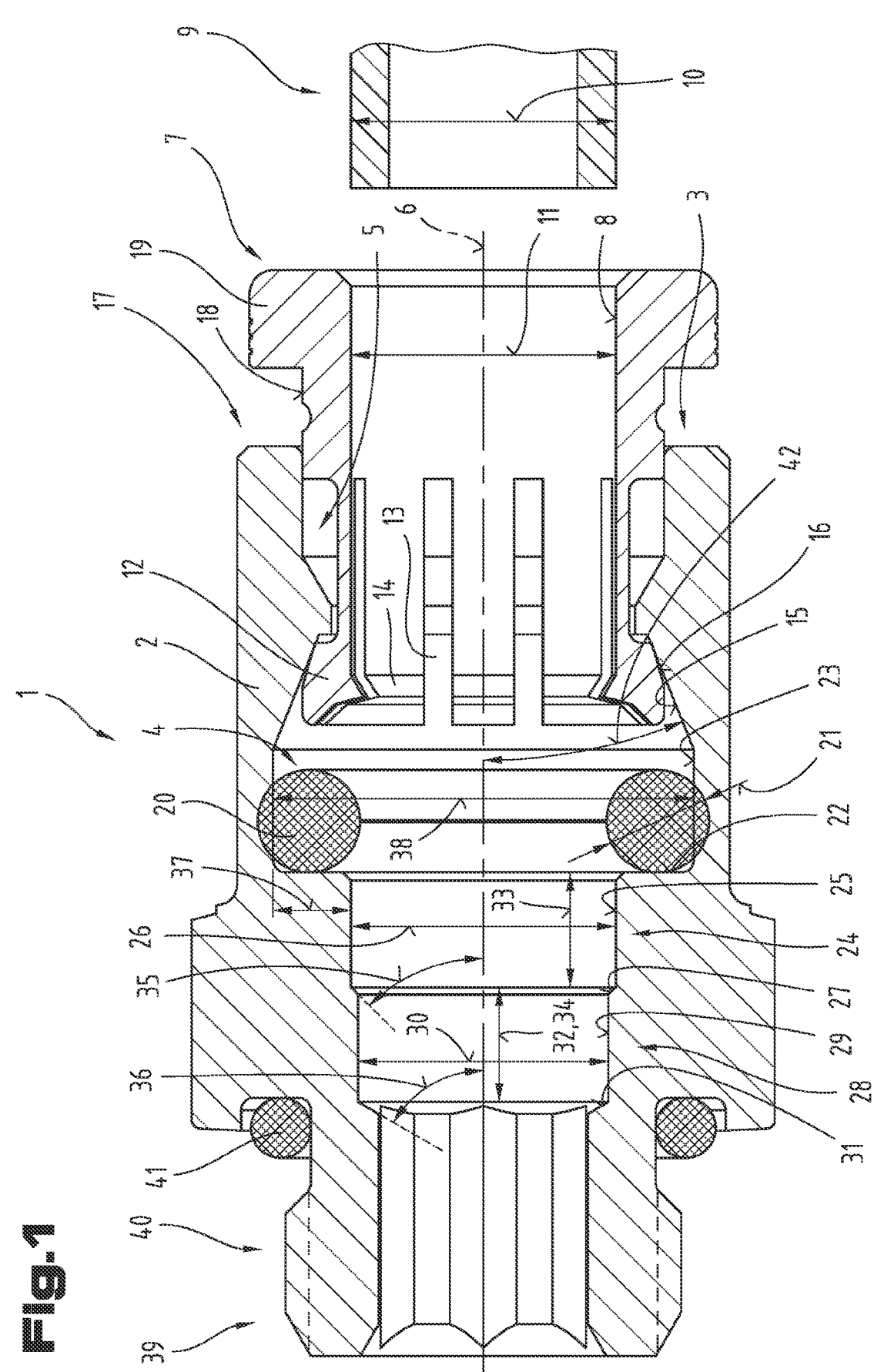
FIG. 1 a first embodiment of a connection device for connecting line-shaped components suitable for guiding a flow medium to other components FIG. 2 a second embodiment of a connection device for connecting line-shaped components suitable for guiding a flow medium to one another FIG. 3 a third embodiment of a connection device for connecting line-shaped components suitable for guiding a flow medium to other components

It is worth noting here that the same parts have been given the same reference numerals or same component designations in the embodiments described differently, yet the disclosures contained throughout the entire description can be applied analogously to the same parts with the same reference numerals or the same component designations. The indications of position selected in the description, such as above, below, on the side etc. refer to the figure directly described and shown, and these indications of position can be applied in the same way to the new position should the position change.

FIG. 1 shows a view of a first embodiment of a connection device 1 in longitudinal section.

As can be seen in FIG. 1, it can be provided that the connection device 1 comprises a base body 2. The base body 2 can have a hose-receiving region 3.

The hose-receiving region 3 can have a seal-receiving region 4. Furthermore, provision can be made for a collet-chuck-receiving region 5 to be formed in the hose-receiving region 3. In particular, it can be provided that the base body 2 is configured to be rotationally symmetrical about a central axis 6 in the hose-receiving region.

The collet-chuck-receiving region 5 can be used to receive a collet chuck 7. In particular, it can be provided that the collet chuck 7 has a connection opening 8 for receiving a line-shaped component 9. The line-shaped component 9 can have a line diameter 10. In particular, different line-shaped components 9 with different line diameters 10 can be inserted into the connection device 1 configured in accordance with the invention. In a special embodiment, it can be provided that the line diameter 10 can be between 5.9 mm and 6.45 mm.

The connection opening 8 can have a connection opening diameter 11. The connection opening diameter 11 can be 6.55 mm.

Furthermore, it can be provided that the collet chuck 7 has one or more clamping elements 12 distributed over the circumference, which can serve to axially fix the line-shaped component 9 in the connection device 1. In particular, it can be provided that the clamping elements 12 are arranged in a segment shaped manner as viewed over the circumference, wherein a clamping element clearance 13 can be formed between the individual clamping elements 12. In addition, the clamping elements 12 can each have a fixing lug 14. The fixing lug 14 can be configured to protrude inwards relative to the connection opening 8 such that it can latch into the line-shaped component 9.

Furthermore, it can be provided that the clamping elements 12 are configured to be elastically resilient in the radial direction and thus the fixing lug 14 can be pressed into the line-shaped component 9 in the radial direction. In particular, provision can be made for a clamping bevel 15 to be formed in the collet-chuck-receiving region 5. The clamping bevel 15 can be configured to taper conically toward a first longitudinal end 17 of the base body 2. Corresponding to the taper, the clamping element 12 can have a clamping element bevel 16. The clamping element bevel 16 of the clamping element 12 can bear against the clamping bevel 15.

When the chuck collet 7 is displaced in the direction of the first longitudinal end 17, the clamping elements 12 can be pressed inwards by the clamping bevel 15. As a result of this measure, the line-shaped component 9 can be secured in the axial direction in the connection device 1. In particular, provision can be made for the fixing lug 14 to be hooked or latched into the line-shaped component 9 in the installed state and thus for self-locking to be achieved in the event of an axial pull of the line-shaped component 9 in the direction of the first longitudinal end 17 of the base body 2.

When the collet chuck 7 is pushed into the base body 2 in the axial direction, the clamping elements 12 can move outwards in the radial direction, such that the fixing lug 14 can be disengaged from the line-shaped component 9 and thus the line-shaped component 9 can be released to be pulling out of the connection device 1. In addition, the collet chuck 7 can have a guide portion 18, using which the collet chuck 7 can be held in the collet-chuck-receiving region 5 of the base body 2 so as to be displaceable in the axial direction. Furthermore, the collet chuck 7 can have a stop shoulder 19, which serves to limit the axial displaceability of the collet chuck 7 relative to the base body 2. As can also be seen in FIG. 1, the stop shoulder 19 can be configured to protrude relative to the first longitudinal end 17 of the base body 2. Furthermore, the stop shoulder 19 can simultaneously serve as an actuating element for displacing the collet chuck 7 in the axial direction and thus for releasing the line-shaped component 9. In particular, the collet chuck 7 can be gripped in the region of the stop shoulder 19 or can be pressed against the stop shoulder 19 by the user in order to displace the collet chuck 7.

A sealing element 20 can be accommodated in the seal accommodating region 4. The sealing element 20 can have a sealing element diameter 21. In particular, it can be provided that the sealing element diameter 21 is 2.5 mm. Furthermore, provision can be made for the sealing element 20 to be formed from a rubber-like material.

Furthermore, provision can be made for the seal-receiving region 4 of the base body 2 to have a sealing element end face 22, which serves to the axially position the sealing element 20.

Furthermore, it can be provided that the seal-receiving region 4 has a sealing element lateral surface 23, which serves to radially position the sealing element 20. In the image according to FIG. 1, the sealing element 20 is illustrated in its unloaded form for demonstrative purposes. For the sake of completeness, it is noted that, contrary to the image according to FIG. 1, the sealing element 20 actually bears against the sealing element lateral surface 23 in the installed state and is therefore deformed accordingly in its overall diameter. In particular, it can be provided that in the plugged-in state of the line-shaped component 9 with the connection device 1, the sealing element 20 bears both against the outer lateral surface of the line-shaped component 9 and against the sealing element lateral surface 23 and deploys its sealing effect with respect to these surfaces.

Furthermore, it can be provided that a first axial stop 24 is formed in the base body 2, which serves to receive a line-shaped component 9 with a first line diameter 10 The first axial stop 24 can have a first cylindrical lateral surface 25, which corresponds to the line diameter 10. In particular, it can be provided that the first cylindrical lateral surface 25 has a first axial stop diameter 26. Furthermore, it can be provided that the first axial stop 24 has a first end face 27.

Furthermore, it can be provided that a second axial stop 28 is formed, which has a second cylindrical lateral surface 29. The second cylindrical lateral surface 29 can have a second axial stop diameter 30. Furthermore, it can be provided that a second end face 31 is formed in the second axial stop 28.

As clearly shown in FIG. 1, it can be provided that the second axial stop diameter 30 is smaller than the first axial stop diameter 26.

The first end face 27 and the second end face 31 can be arranged at an end face distance 32 from one another. Furthermore, it can be provided that the first axial stop 24 has a first axial stop longitudinal extension 33. The second axial stop 28 can have a second axial stop longitudinal extension 34.

As can be seen in FIG. 1, it can be provided that the second axial stop longitudinal extension 34 and the end face distance 32 are of the same size.

As can further be seen in FIG. 1, it can be provided that the first end face 27 is arranged at a first angle 35 to the central axis 6. It can further be provided that the second end face 31 is arranged at a second angle 36 to the central axis 6. As can also be seen in FIG. 1, provision can be made for the seal-receiving region 4 to have a seal-receiving height 37. The seal-receiving height 37 can be calculated from the seal receiving diameter 38 of the sealing element lateral surface minus the first axial stop diameter 26 divided by 2. Mathematically: (seal receiving diameter 38—first axial stop diameter 26)/2

As can further be seen from FIG. 1, provision can be made for the base body 2 to have a screw-in region 39 at a second longitudinal end 40, on which an external thread can be formed. The connection device 1 can be received or fixed in a corresponding threaded bore by means of the screw-in region 40. Furthermore, it can be provided that a screw-in seal 41 is formed in the screw-in region 40.

As can also be seen in FIG. 1, it can be provided that the base body 2 can have a through opening extending from the first longitudinal end 17 to the second longitudinal end 39, through which a fluid can flow.

Furthermore, it can be provided that the clamping bevel 15 has a clamping bevel opening angle 42.

Figure 2:
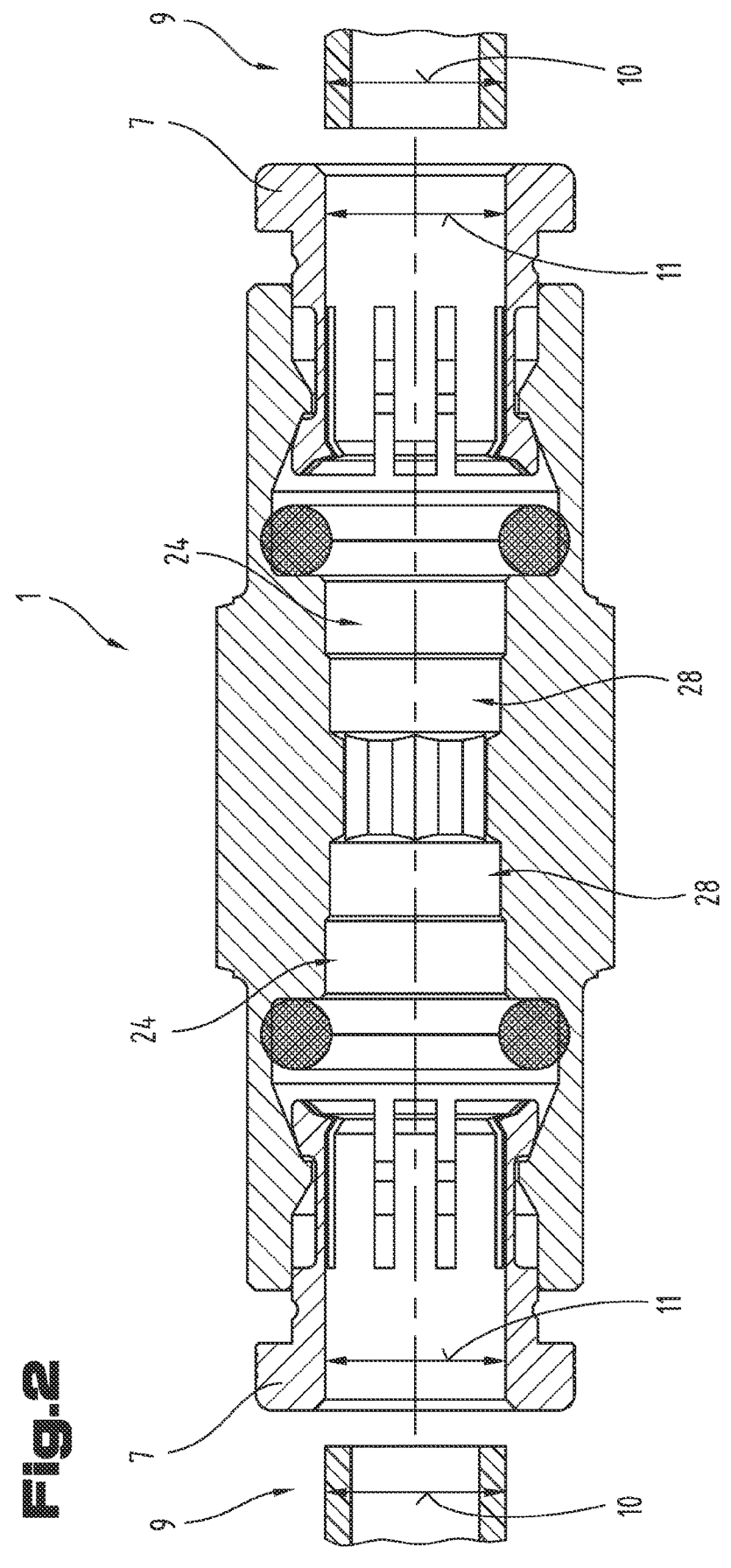

FIG. 2 shows a further, optionally independent, embodiment of the connection device 1, wherein the same reference numerals or component designations as in the preceding FIG. 1 are used again for identical parts. To avoid unnecessary repetitions, reference is made to the detailed description in preceding FIG. 1.

As can be seen in FIG. 2, it can be provided that the connection device 1 is not used for screwing into a component as per the embodiment according to FIG. 1, but that the connection device 1 has a collet chuck 7 on both sides. The connection device 1 can be symmetrically formed with respect to a longitudinal central plane and thus serve to receive a line-shaped component 9 on both sides.

As it is shown in FIG. 2, both sides of the connection device 1 can be configured in accordance with the embodiments according to FIG. 1. In particular, it can be provided that the first axial stop 24 and the second axial stop 28 are formed on both sides of the base body 2 and the connection device 1 can thus be used on both sides to receive line-shaped components 9 with variable line diameters 10.

Figure 3:
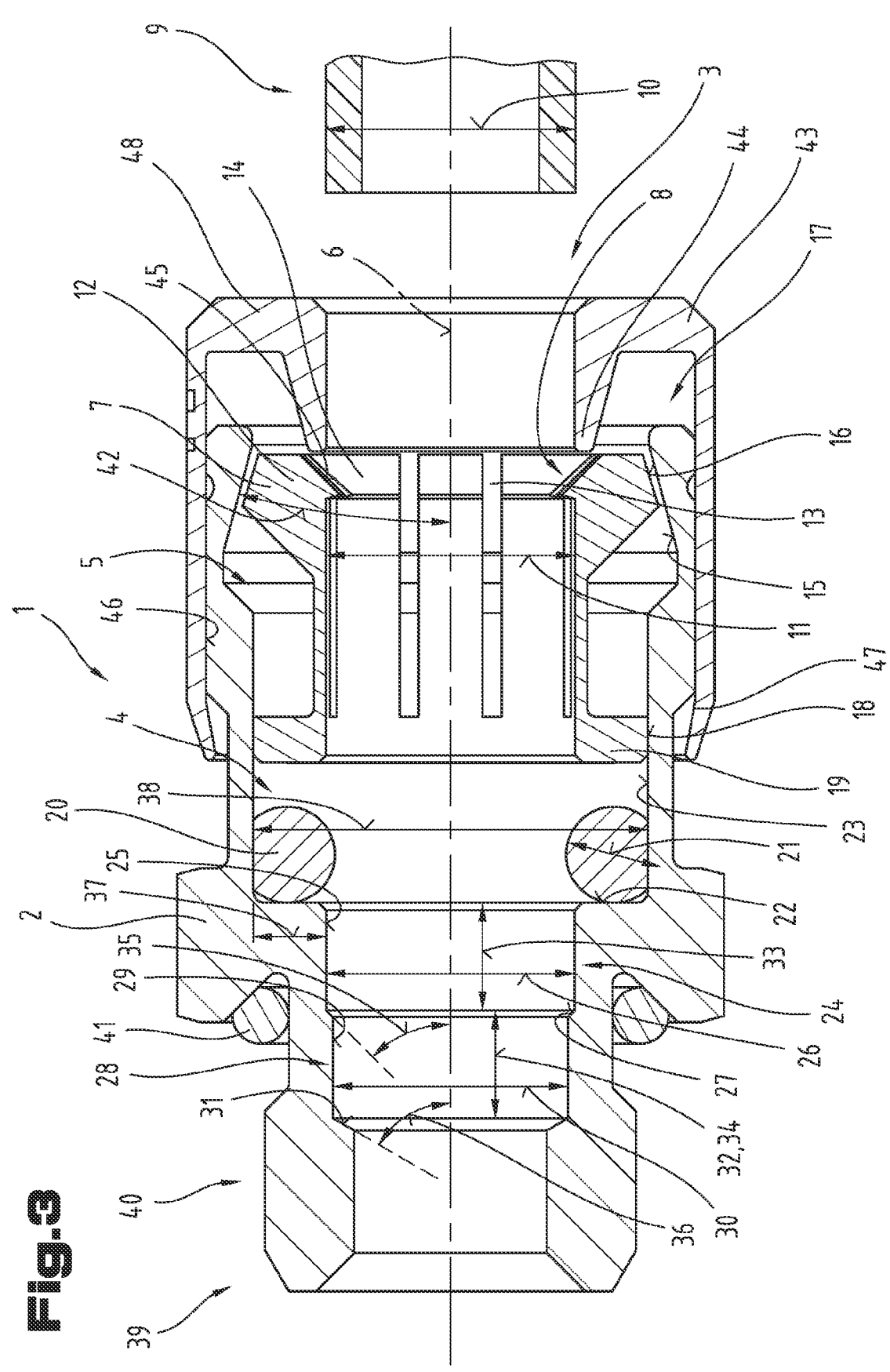

FIG. 3 shows a further, optionally independent, embodiment of the connection device 1, wherein the same reference numerals or component designations as in the preceding FIG. 1 are used again for identical parts. To avoid unnecessary repetitions, reference is made to the detailed description in preceding FIG. 1.

As shown in FIG. 3, it can be provided that the clamping element bevel 16 is arranged parallel to the clamping bevel 15 in the non-actuated state.

As is further shown in the alternative embodiment according to FIG. 3, provision can be made for a collet chuck opener 43 to be formed. The collet chuck opener 43 can be configured as a separate component from the collet chuck 7. In particular, it can be provided that the collet chuck opener corresponds to the clamping elements 12. In particular, it can be provided that the collet chuck opener 43 has an actuating region 44, which serves to bear against an opening bevel 45 of the clamping elements 12.

When the collet chuck opener 43 is axially displaced relative to the collet chuck 7, in particular towards the collet chuck 7, the clamping elements 12 can be pressed outwards by the actuating region 44 of the collet chuck opener 43 such that the fixing lugs 14 can be disengaged from any line-shaped component 9 accommodated in the connection device 1. The line-shaped component 9 can be removed from the connection device as a result of this.

To guide the axial displacement, the collet chuck opener 43 can have a guide region 46. The guide region 46 can be arranged externally around the base body 2. In particular, it can be provided that the guide region 46 of the collet chuck opener 43 encloses the base body 2 in a sleeve-like manner.

Furthermore, it can be provided that the guide region 46 has an offset 47 drawn towards the central axis 6 at a longitudinal end facing away from the collet chuck opener 43.

Furthermore, it can be provided that the collet chuck opener 43 has a first end wall 48, which connects the guide region 46 to the actuating region 44.

FIG. 3 shows the connection device 1 in its resting position, in which the individual clamping elements 12 are in their resting position. In this case, the clamping elements 12 can be in engagement with a line-shaped component 9 when the latter is inserted, or the line-shaped component 9 can be pushed into the connection device 1. If, in a position of the connection device 1 as per FIG. 3, the collet chuck opener 43 is displaced to the left, the collet chuck opener 43 can come to bear against the opening bevel 45. Upon further displacement of the collet chuck opener 43 to the left, the clamping elements 12 are pressed outwards by the actuating region 44, resulting in their elastic deformation. In this case, the clamping element bevel 16 can come to bear against the clamping bevel 15.

When the collet chuck opener 43 is released, the clamping elements 12 can shift inward again due to the spring force of the elastic deformation. In the presence of a line-shaped component 9, the fixing lugs 14 can press positively into the line-shaped component 9 and plastically deform it.

The exemplary embodiments show possible embodiment variations, although it is to be noted here that the invention is not limited to the specifically represented embodiment variations of the same, but rather various combinations of the individual embodiment variations with one another are possible, and that given the technical teachings provided by the present invention this variation possibility is within the ability of the skilled person in this technical field.

The scope of protection is determined by the claims. However, the description and the drawings are to be referenced for the interpretation of the claims. Individual features or combinations of features from the various exemplary embodiments shown and described can represent independent inventive solutions in themselves. The problem to be solved, upon which the independent, inventive solutions are based, can be derived from the description.

All value ranges specified in the current description are to be understood such that they include any and all sub-ranges, e.g., the specification 1 to 10 is to be understood such that all sub-ranges, starting from the lower limit 1 and the upper limit 10 are included, i.e., all sub-ranges begin with a lower limit of 1 or more and end at an upper limit of 10 or less, e.g., 1 to 1.7, or 3.2 to 8.1, or 5.5 to 10.

As a matter of form and by way of conclusion, it is noted that, to improve understanding of the structure, elements have partially not been shown to scale and/or enlarged and/or shrunk.

LIST OF REFERENCE NUMERALS

| 1  | Connection device |
|----|-------------------|
| 2  | Base body |
| 3  | Hose-receiving region |
| 4  | Seal-receiving region |
| 5  | Collet-chuck-receiving region |
| 6  | Central axis |
| 7  | Collet chuck |
| 8  | Connection opening |
| 9  | Line-shaped component |
| 10 | Line diameter |
| 11 | Connection opening diameter |
| 12 | Clamping element |
| 13 | Clamping element clearance |
| 14 | Fixing lug |
| 15 | Clamping bevel |
| 16 | Clamping element bevel |
| 17 | First longitudinal end |
| 18 | Guide portion |
| 19 | Stop shoulder |
| 20 | Sealing element |
| 21 | Sealing element diameter |
| 22 | Sealing element end face |
| 23 | Sealing element lateral surface |
| 24 | First axial stop |
| 25 | First cylindrical lateral surface |
| 26 | First axial stop diameter |
| 27 | First end face |

-continued

| 28 | Second axial stop |
|----|-------------------|
| 29 | Second cylindrical lateral surface |
| 30 | Second axial stop diameter |
| 31 | Second end face |
| 32 | End face distance |
| 33 | First axial stop longitudinal extension |
| 34 | Second axial stop longitudinal extension |
| 35 | First angle |
| 36 | Second angle |
| 37 | Seal-receiving height |
| 38 | Seal receiving diameter |
| 39 | Second longitudinal end |
| 40 | Screw-in region |
| 41 | Screw-in seal |
| 42 | Clamping bevel opening angle |
| 43 | Collet chuck opener |
| 44 | Actuating region |
| 45 | Opening bevel |
| 46 | Guide region |
| 47 | Offset |
| 48 | First end wall |

The invention claimed is:

1. A connection device comprising:
a base body with a hose-receiving region, wherein a seal-receiving region is formed in the hose-receiving region and wherein a collet-chuck-receiving region is formed in the hose-receiving region;
a collet chuck with a connection opening for receiving a line-shaped component, the connection opening having a connection opening diameter, the collet chuck having a plurality of elastically resilient clamping elements distributed over the circumference, the collet chuck being received in the collet-chuck-receiving region so as to be displaceable in the axial direction relative to the base body, the clamping elements being displaceable in the radial direction by axial displacement of the collet chuck relative to the base body; and
a sealing element, which is arranged in the seal-receiving region and forms a seal between the line-shaped component and the base body,
wherein the connection device is configured to receive line-shaped components with different line diameters,
wherein a first axial stop is formed in the base body, having a first cylindrical lateral surface with a first axial stop diameter, and a second axial stop is formed, having a second cylindrical lateral surface with a second axial stop diameter,
wherein a first type of the line-shaped components with a first line diameter can be attached to the first axial stop, and a second type of line-shaped components with a second line diameter can be attached to the second axial stop,
wherein the first axial stop has a first end face and the second axial stop has a second end face, wherein the first end face and the second end face are arranged spaced apart from one another in the axial direction at an end face distance,
wherein the first axial stop and the second axial stop are coaxial to each other,
wherein the first end face is arranged at a first angle to a central axis and wherein the second end face is arranged at a second angle to the central axis, wherein the first angle and/or the second angle is between 30° and 89°.

2. The connection device according to claim 1, wherein the second axial stop diameter is between 87% and 99.9% of the connection opening diameter.

3. The connection device according to claim 1, wherein the first axial stop has a first axial stop longitudinal extension and wherein the second axial stop has a second axial stop longitudinal extension, wherein the first axial stop longitudinal extension is between 90% and 110% of the second axial stop longitudinal extension.

4. The connection device according to claim 1, wherein the sealing element has a cross-sectional sealing element diameter, wherein the cross-sectional sealing element diameter is between 25% and 55% of the connection opening diameter.

5. The connection device according to claim 1, wherein the sealing element has a hardness between 30 Shore A and 75 Shore A.

6. The connection device according to claim 1, wherein the sealing element has a cross-sectional sealing element diameter and wherein the seal-receiving region has a seal-receiving height, wherein the seal-receiving height is between 50% and 90% of the cross-sectional sealing element diameter.

7. The connection device according to claim 1, wherein a clamping bevel has a clamping bevel opening angle between 10° and 45°.

8. The connection device according to claim 1, wherein a collet chuck opener is formed, which corresponds to the clamping elements, wherein the collet chuck opener is displaceable relative to the collet chuck, and wherein the collet chuck opener has an actuating region, which is configured to bear against an opening bevel of the clamping elements.

9. The connection device according to claim 8, wherein the collet chuck opener has a guide region, which is arranged on the outside around the base body and is configured for axially guided displacement on the base body.

10. The connection device according to claim 9, wherein the guide region has an offset drawn towards the central axis at a longitudinal end facing away from the collet chuck opener.

11. The connection device according to claim 9, wherein the collet chuck opener has a first end wall, which connects the guide region to the actuating region.

12. A connection device comprising:
a base body with a hose-receiving region, wherein a seal-receiving region is formed in the hose-receiving region and wherein a collet-chuck-receiving region is formed in the hose-receiving region,
a collet chuck with a connection opening for receiving a line-shaped component, the connection opening having a connection opening diameter, the collet chuck having a plurality of elastically resilient clamping elements distributed over the circumference, the collet chuck being received in the collet-chuck-receiving region so as to be displaceable in the axial direction relative to the base body, the clamping elements being displaceable in the radial direction by axial displacement of the collet chuck relative to the base body, and
a sealing element, which is arranged in the seal-receiving region and forms a seal between the line-shaped component and the base body;
wherein the connection device is configured to receive line-shaped components with different line diameters in the hose-receiving region,
wherein a first axial stop is formed in the base body, having a first cylindrical lateral surface with a first axial stop diameter, and a second axial stop is formed, having a second cylindrical lateral surface with a second axial stop diameter, wherein a first type of the line-shaped components with a first line diameter can be attached to the first axial stop, and a second type of line-shaped components with a second line diameter can be attached to the second axial stop, wherein the first axial stop has a first end face and the second axial stop has a second end face, wherein the first end face and the second end face are arranged spaced apart from one another in the axial direction at an end face distance, wherein the first axial stop and the second axial stop are aligned parallel to each other, and wherein the second axial stop diameter is between 87% and 99.9% of the connection opening diameter such that the line-shaped components having different line diameters can be secured in the axial direction in the connection device.

\* \* \* \* \*